United States Patent
Yim et al.

(10) Patent No.: US 8,243,649 B2
(45) Date of Patent: Aug. 14, 2012

(54) METHOD FOR TRANSMITTING PACKETS IN RELAY NETWORKS

(75) Inventors: Raymond Yim, Cambridge, MA (US); Andreas F. Molisch, Pasadena, CA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 892 days.

(21) Appl. No.: 12/324,604

(22) Filed: Nov. 26, 2008

(65) Prior Publication Data

US 2010/0128651 A1    May 27, 2010

(51) Int. Cl.
*H04B 7/14*    (2006.01)
(52) U.S. Cl. ......... 370/315; 370/487; 370/503; 370/537
(58) Field of Classification Search .................. 370/315
See application file for complete search history.

(56) References Cited

U.S. PATENT DOCUMENTS

| | | | |
|---|---|---|---|
| 6,822,947 B2* | 11/2004 | Sawyer et al. | 370/328 |
| 7,929,411 B2* | 4/2011 | Scaglione et al. | 370/208 |
| 2008/0165720 A1* | 7/2008 | Hu et al. | 370/315 |
| 2008/0227461 A1* | 9/2008 | Dayal et al. | 455/452.2 |
| 2009/0034554 A1* | 2/2009 | Evans et al. | 370/468 |
| 2010/0246598 A1* | 9/2010 | Bremer et al. | 370/464 |
| 2011/0161776 A1* | 6/2011 | Liu et al. | 714/755 |

OTHER PUBLICATIONS

Willems et al., "The discrete memoryless multiple-access channel with cribbing encoders," IEEE Trans. Inform. Theory, vol. 31, pp. 313-327, May 1985.
Nabar et al, "Fading relay channels: performance limits and space-time signal design," IEEE J. Select. Areas Commun., vol. 22, pp. 1099-1108, Aug. 2004.
Yang et al., "Resource allocation for cooperative relaying," in 42nd Annual Conf. on Inform. Sci. and Sys., pp. 848-853, Mar. 2008.
Gunduz et al., "Opportunistic cooperation by dynamic resource allocation," IEEE Trans. Wireless Commun., vol. 6, pp. 1446-1454, Apr. 2007.
Li et al. "Slepian-Wolf cooperation: a practical and efficient compress-and-forward relay scheme," Proc. 43rd Annual Allerton Conf. on Commun., Contr. and Computing, Sep. 2005.
Slepian et al., "Noiseless coding of correlated information sources," IEEE Trans. Inform. Theory, vol. 19, pp. 471-480, Jul. 1973.
Van der Meulen et al, "A survey of multi-way channels in information theory: 1961-1976," IEEE Trans. Inform. Theory.

* cited by examiner

*Primary Examiner* — Yemane Mesfin
*Assistant Examiner* — Wanda Russell
(74) *Attorney, Agent, or Firm* — Dirk Brinkman; Gene Vinokur

(57) ABSTRACT

A method transmits an L bit packet in a relay network including a source node, a relay node and a destination node. The source node partitions the packet into first fragment of $\beta L$ bits and a second fragment of $(1-\beta)$ bits. The first fragment is transmitted from the source node to the relay node at a first data rate during a first phase. The second fragment is transmitted from the source node to the destination node at a second data rate during a second phase while the first fragment is retransmitted from the relay node to the destination node at a third data rate.

13 Claims, 6 Drawing Sheets

METHOD FOR TRANSMITTING PACKETS IN RELAY NETWORKS

FIELD OF THE INVENTION

This invention relates generally to wireless relay networks, and more particularly to transmitting packets in relay networks.

BACKGROUND OF THE INVENTION

Relay Networks

In a wireless network, such as cellular and ad hoc network, relay nodes can increase the range and the capacity of the network. Relays provide multiple paths between a source node and a destination node to increases the diversity of the network. This can reduce large scale fading due to shadowing.

For the purpose of this description, a simple relay network includes one source node, one relay node, and one destination node. This relay network can give fundamental insights into the design and performance limits of relay networks in general, as described below. This type of network also has practical applications in the design of cellular networks, where the relay node can extend the range of the base station and improve the capacity. The simple relay network can also serve as a building block of larger relay networks.

A number of different protocols are known for relaying packets. An amplify-and-forward (AF) protocol can achieve gains with a simple power boosting circuit at the relay. In a decode-and-forward (DF) protocol, the relay decodes the packet to eliminate noise effects and then re-encodes and retransmits the packet. A compress-and-forward (CF) compresses the data before forwarding. It is known that such relaying protocols can increase achievable data rates.

Split-and-Combine Relaying (SCR) Protocol

In a split-and-combine relaying (SCR) protocol, a packet is split into two fragments and transmitted to the destination in two phases, where the fragments are combined. One method uses a memoryless multiple access channel with cribbing encoders. That method does not consider energy consumption at all. Another method does consider energy consumption. However, the durations of the first and second phases of SCR are fixed to be equal, and independent of the link qualities. Another method analyzes a tradeoff between transmit power and rate of different cooperative techniques in the context of delay-limited capacity in which partial channel state information is known in a time-varying channel. None of the above methods consider the total energy consumption.

Slepian-Wolf Cooperation

Slepian-Wolf cooperation has been used in prior art relay networks. However, there the simultaneous transmissions by the source and relay are not allowed.

The following references teach the prior art SCR and Slepian-Wolf cooperation as summarized above, Willems et al., "The discrete memoryless multiple-access channel with cribbing encoders," IEEE Trans. Inform. Theory, vol. 31, pp. 313-327, May 1985, Nabar et al, "Fading relay channels: performance limits and space-time signal design," IEEE J. Select. Areas Commun., vol. 22, pp. 1099-1108, August 2004, Yang et al., "Resource allocation for cooperative relaying," in 42nd Annual Conf. on Inform. Sci. and Sys., pp. 848-853, March 2008, Gunduz et al., "Opportunistic cooperation by dynamic resource allocation," IEEE Trans. Wireless Commun., vol. 6, pp. 1446-1454, April 2007, Li et al. "Slepian-Wolf cooperation: a practical and efficient compress-and-forward relay scheme," Proc. 43rd Annual Allerton Conf. on Commun., Contr. and Computing, September 2005, Slepian et al., "Noiseless coding of correlated information sources," IEEE Trans. Inform. Theory, vol. 19, pp. 471-480, July 1973, and Van der Meulen et al, "A survey of multi-way channels in information theory: 1961-1976," IEEE Trans. Inform. Theory, vol. 23, pp. 1-37, January 1977, all incorporated herein by reference.

None of the conventional protocols consider how transmission powers and transmission data rates affect the overall energy consumption in the network. If the effect were known, then energy consumption could be optimized.

SUMMARY OF THE INVENTION

In a wireless communications network according to embodiments of the invention, relay nodes can increase range and capacity, as well as reducing energy consumption. The embodiments of the invention minimize total energy consumption for a given data rate. More specifically, the relay network uses a split-combine-relaying (SCR) protocol, which for many typical parameter settings, performs better than conventional decode-and-forward protocols.

In SCR according to embodiment of the invention, the source node splits (partitions) a packet into two fragments. In a first phase, the source node transmits the first fragment to the relay node. In the second phase, the source node transmits the second fragment directly to the destination node, while, at the same time, the relay node transmits the first fragment to the destination.

The method according to embodiments of the invention optimizes the amount of data in each fragment. The method also optimizes the amount of time for each of the phases, and the corresponding transmission powers for a prescribed data rate, i.e., latency or delay for each phase. The SCR protocol can also use Slepian-Wolf coding of the fragments to further reduce energy consumption.

Such optimizations for data, time, energy and data rate are not known in the prior art. In the SCR protocol according to embodiments of the invention, the source node knows the fragment of data that is being sent by the relay in the second phase. This can further reduce the total energy consumption by 16%.

DETAILED DESCRIPTION OF THE PREFERRED EMBODIMENT

Network Model.

Figure 1A:
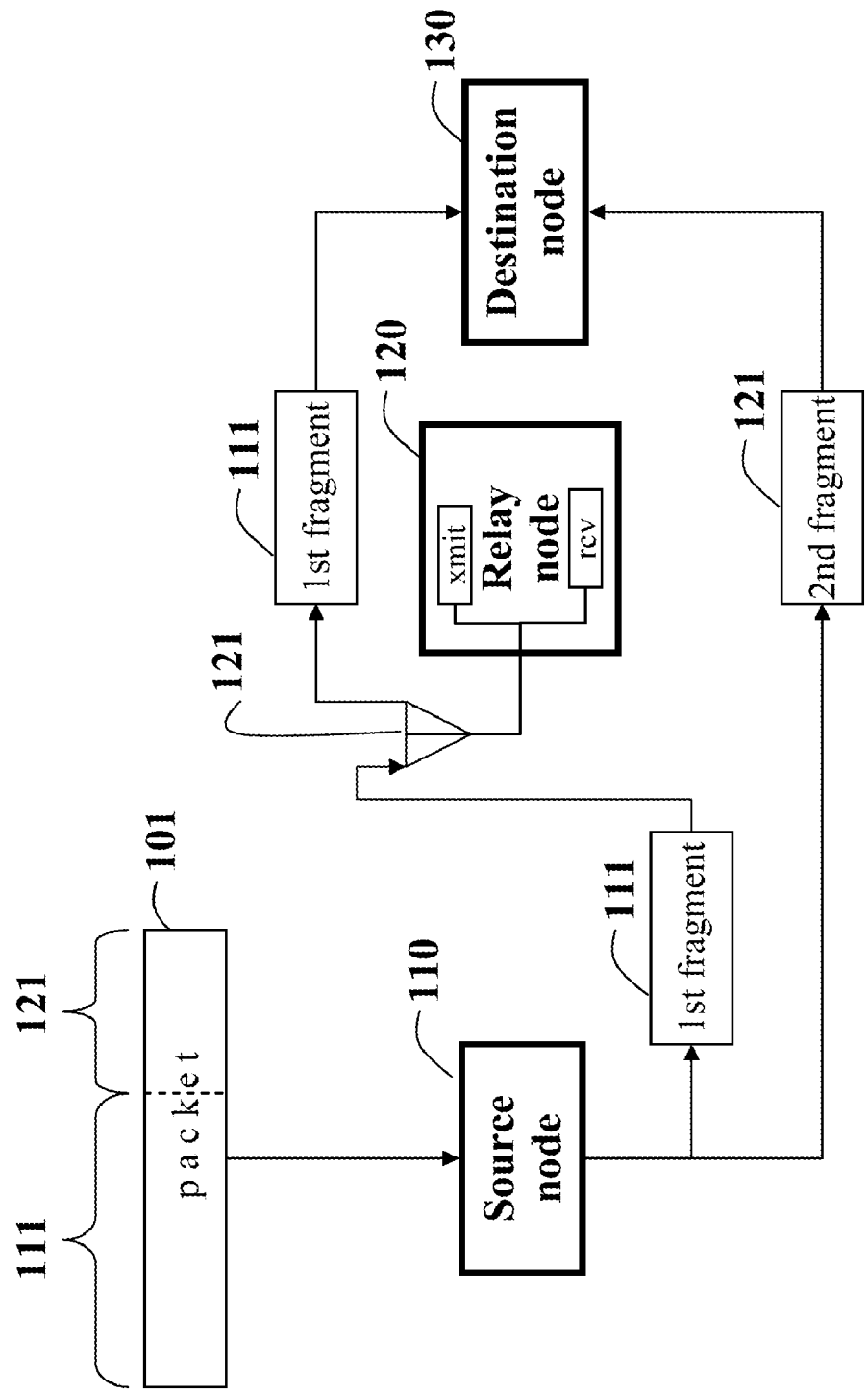
FIG. 1A is a schematic of a relay network according to embodiments of the invention, when Slepian-Wolf coding is not used.

FIG. 1A shows a wireless relay network according to one embodiment of our invention. In this embodiment, Slepian-Wolf coding is not used. The network minimally includes a source node (s) 110, a relay node (r) 120 and a destination node (d) 130. All nodes have a single antenna 121 for transmission and reception. Also, each node only needs one radio frequency (RF) chain for transmitting (xmt) and one for receiving (rcv). All the nodes operate in half-duplex mode while switching the single antenna between the RF chains. The basic transceiver structure for all nodes is shown for the relay.

The network uses a split-combine-relaying (SCR) protocol. In SCR, the source node 110 partitions a packet 101 of L bits into two fragments. A packet split ratio is β. In a first phase, the source node transmits the first fragment of βL bits 111 to the relay node using a first data rate. The relay node operates in decode-and-forward (DF) mode.

In the second phase, the source node transmits the second fragment (1−β)L 121 to the destination node at a second data rate, while, at the same time, the relay node retransmits the first fragment to the destination at a third data rate. The first and second rates do not need to be same even thought the fragments are transmitted concurrently using the same channel and frequency band.

The destination node combines the two fragments in the two packets to recover the original packet transmitted by the source. The first, second and third data rates are optimized energy consumption during the transmissions is minimized.

Figure 1B:
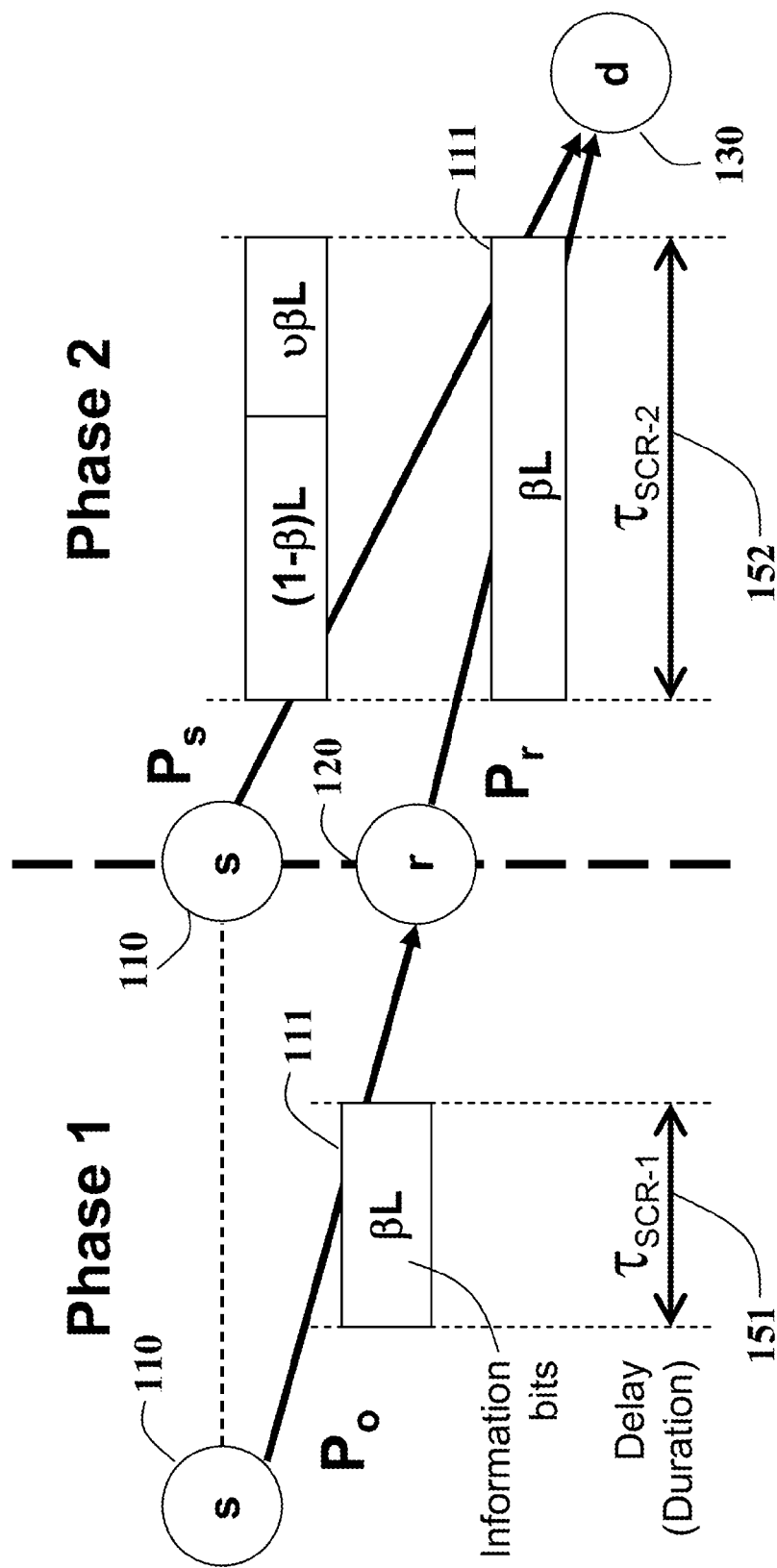
FIG. 1B is a schematic of a relay network according to embodiments of the invention, when Slepian-Wolf coding is used.

FIG. 1B the first and second phase of the SCR protocol with and without Slepian-Wolf coding. In FIG. 1B, the total number of bits to be sent from the source to the destination is L. The packet split ratio is β. If the parameter υ=0, this is the basic SCR protocol, and υ>0 corresponds to SCR with Slepian-Wolf coding. In the later case, some fraction υ of the first fragment βL 111 fragment is retransmitted by the source along with the second fragment 112.

The power used by the source node for the first and second phases are respectively $P_0$ and $P_s$, and the power used by the second phase is $P_r$. The delays for the first and second phases are $\tau_{SCR-1}$ and $\tau_{SCR-2}$, respectively.

The channels between the nodes are modeled as quasi-static additive white Gaussian noise (AWGN) channels. The method can be extended in a straightforward way to channels that are fading and/or frequency-selective. The nodes can occasionally update their power gains to reflect possible changes of channel state information (CSI). The channel power gain between the source node s and the relay node r is $|h_{sr}|^2$. The channel power gain between the relay node s and the destination node d is $|h_{rd}|^2$. The destination uses $h_{sd}$ and $h_{rd}$ for the optimal combining of the fragments.

When the source transmits the first (fragment) packet, the packet can only be addressed to the relay. Hence, the second (fragment) packet is sent after some delay. We consciously ignore the broadcast effect, i.e., the case when the destination node receives the transmission from the source to the relay, and stores soft information to enable energy accumulation. However, in many practical cases, the destination may not be able to synchronize to the packet due to low received SINR. Furthermore, the energy needed to receive the signals at the destination can be larger than the total transmit energy saved by the destination "overhearing" the transmission of the first fragment packet by the source.

The relay node has a single transceiver chain, thus the relay operates in half-duplex mode and can only receive or transmit signals at a given moment in time. The relay can forward the first fragment after having correctly decoded the fragment. If the checksum of the decoded packet with the first fragment is incorrect, then the packet is discarded.

The receiver has an advanced signal processing capability that enables multiple-packet reception (MPR). For the purpose of the subsequent discussion, we assume that the contents of packets are received successfully when a transmission data rate satisfies the information theoretic bounds for Gaussian channels. Other criteria for "successful reception" can be used, e.g., fulfilling the capacity given a finite-modulation alphabet.

For example, when the source transmits the packet directly to the destination, the packet is received successfully if and only if the transmission data rate $R_{sd-DT}$ from the source to the destination satisfies $R_{sd-DT} \leq C(|h_{sd}|^2 P_s)$, where $$C(x) = \frac{W}{2} \log\left(1 + \frac{x}{\sigma^2}\right), \quad (1)$$

where W is the available bandwidth in the network, $P_s$ is the transmission power at the source node, $\sigma^2$ is the receiver noise power, and log denotes the logarithm in base 2.

When the source and the relay transmit packets concurrently to the destination using multiple-packet reception (mpr), both packets are received successfully if and only if the transmission data rate of the packet from the source to the destination, $R_{sd-mpr}$, and the transmission data rate of the packet from the relay to the destination, $R_{rd-mpr}$, satisfy the information theoretic bounds for the multiple access channel.

$$R_{sd-mpr} \leq C(|h_{sd}|^2 P_s) \quad (2)$$

$$R_{rd-mpr} \leq C(|h_{rd}|^2 P_r) \quad (3)$$

$$R_{sd-mpr} + R_{rd-mpr} \leq C(|h_{sd}|^2 P_s + |h_{rd}|^2 P_r), \quad (4)$$

where $P_s$ and $P_r$ are the transmission power of the source and relay node, respectively during the second phase.

Split- and Combine Relaying

It is well understood that the multiple access capacity region of two nodes transmitting concurrently is larger than when just time sharing of the channel between the two nodes is used. The multiple access capacity region is expressed in Equations (2-4).

Figure 2:
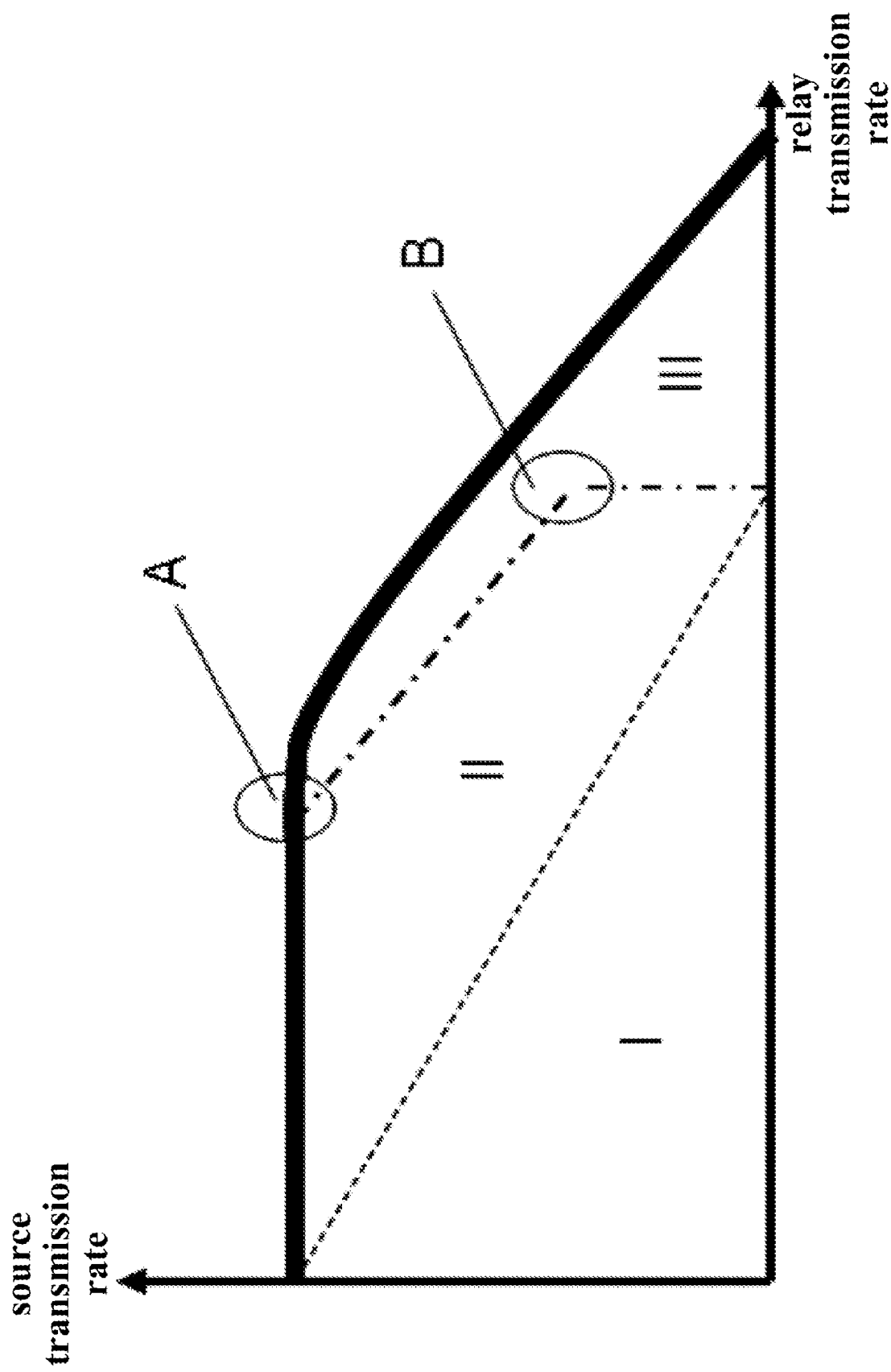
FIG. 2 is a graph of source transmission rate as a function of relay transmission rate.

FIG. 2 shows this graphically. In FIG. 2, the vertical axis is the transmission data rate at the source, and the horizontal axis is the transmission data rate at the relay. FIG. 2 shows the capacity of time-sharing (region I), multiple access channel (regions I and II), and a Slepian-Wolf channel (regions I and II and III).

Initially, the packet is present only at the source. Therefore, multiple access capacity of the source and relay can only be used after the source transmits the first fragment to the relay.

Phase 1

The source transmits the first fragment 111 of the packet 101 to the relay. The fragment includes βL bits, where β is a packet splitting factor, 0<β<1). The relay decodes the βL bits.

Phase 2

The source transmits the second fragment 112 to the destination. The second fragment has (1−β)L bits. If Slepian-Wolf coding is used, then some fraction of the first fragment is retransmitted by the source during the second phase. At the same time, the relay retransmits the first fragment to the destination. The MPR-enabled destination node decodes and combines the fragments received from the source and the relay.

Figure 4:
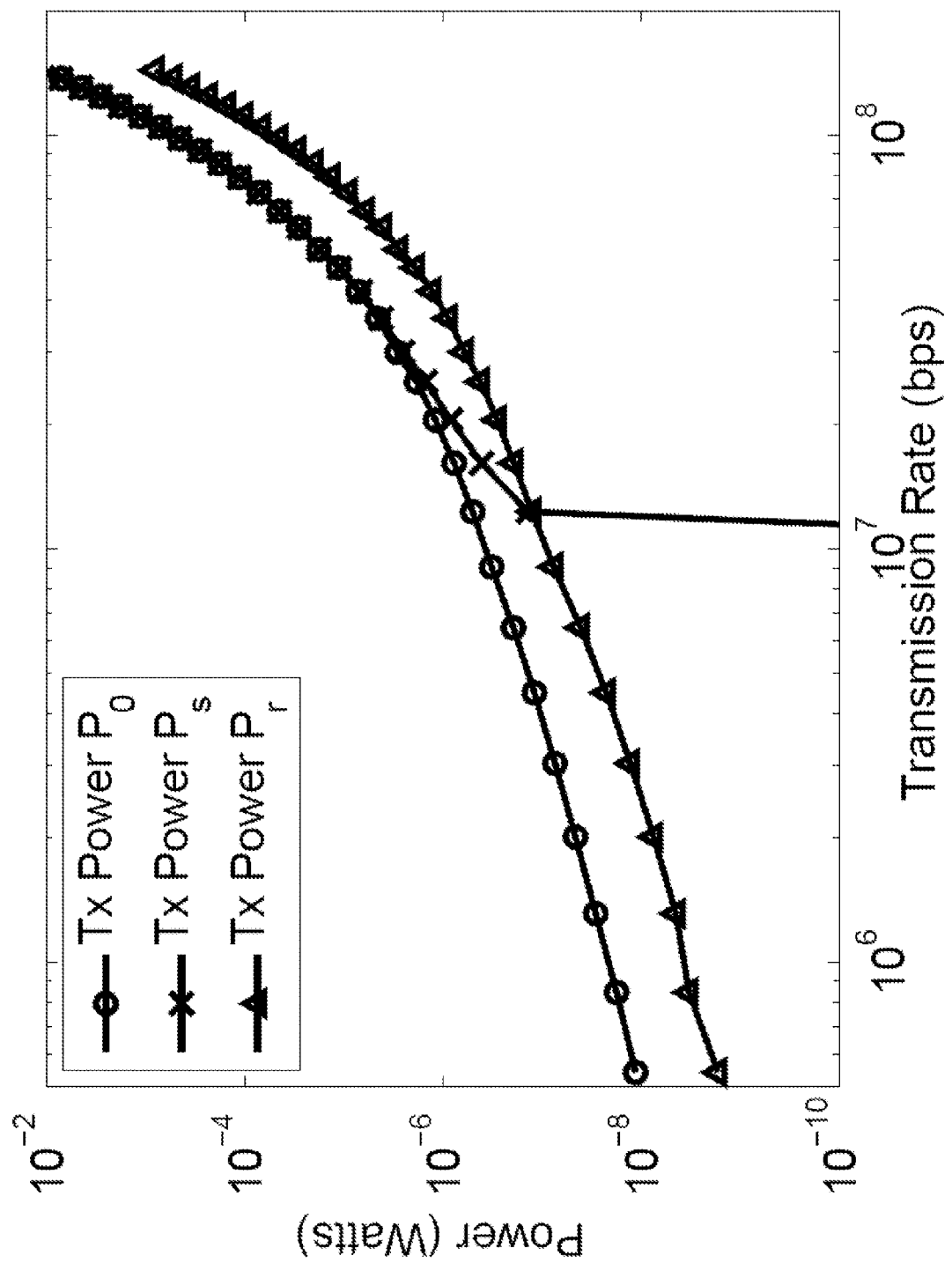
FIG. 4 are graphs of power as a function of transmission rate in the relay network according to embodiments of the invention.

The source uses transmission power $P_0$ during Phase 1 of the SCR protocol as can be seen in FIGS. 1B and 4. Hence, the delay 151 of Phase 1 is $$\tau_{SCR-1} = \frac{\beta L}{R_{sr}}, \quad (5)$$

where $$R_{sr} = \frac{W}{2} \log\left(1 + \frac{|h_{sd}|^2 P_0}{\sigma^2}\right).$$

The energy consumption at the source is $$E_{SCR-1} = \frac{\beta L P_0}{R_{sr}}. \quad (6)$$

During Phase 2 of the SCR protocol, the source and relay use transmission powers $P_s$ and $P_r$, respectively, see FIG. 4. The delay 152 of Phase 2 is $$\tau_{SCR-2} = \max\left\{\frac{\beta L}{R_{rd-mpr}}, \frac{(1-\beta)L}{R_{sd-mpr}}\right\}, \quad (7)$$

where $R_{sd-mpr}$ and $R_{rd-mpr}$ are selected using Equations (2-4), and the total energy consumption during phase 2 is $$E_{SCR-2} = \frac{\beta L P_r}{R_{rd-mpr}} + \frac{(1-\beta)L P_s}{R_{sd-mpr}}. \quad (8)$$

The total delay of the SCR is $\tau_{SCR} = \tau_{SCR-1} + \tau_{SCR-2}$, and the total energy consumption is $E_{SCR} = E_{SCR-1} + E_{SCR-2}$, which means that the overall transmission data rate is $$R = \frac{L}{\tau_{SCR}}.$$

We analyze the behavior of our SCR protocol. To minimize energy consumption during phase 2 of the SCR, the transmission delays for transmitting from the source and relay to the destination should be equal.

The energy consumption of the SCR is optimal (minimized) when $$\frac{\beta L}{R_{rd-mpr}} < \frac{(1-\beta)L}{R_{sd-mpr}}.$$

For optimal performance, the transmission data rates of the source and the relay are selected in the segment between points A and B in FIG. 2.

The energy consumption during phase 2 of the SCR is optimal (minimized) when the transmission data rates of the source and relay are set such that Equation (4) is satisfied with equality.

Given the above, and the maximum data rates $R_{sd-mpr}$ and $R_{rd-mpr}$ given in Equations (2-3), we can determine the bounds on the packet split ratio $\beta$, and the respective data rates $R_{sd-mpr}$ and $R_{rd-mpr}$.

For the optimal SCR, the packet splitting factor is in the range $$1 - \frac{C(|h_{sd}|^2 P_s)}{C(|h_{sd}|^2 P_s + |h_{rd}|^2 P_r)} \leq \beta \leq \frac{C(|h_{rd}|^2 P_r)}{C(|h_{sd}|^2 P_s + |h_{rd}|^2 P_r)},$$

and the optimal transmission data rates in the second phase at the source and relay are respectively $$R_{sd-mpr} = (1-\beta)C(|h_{sd}|^2 P_s + |h_{rd}|^2 P_r) \quad (9)$$

$$R_{rd-mpr} = \beta C(|h_{sd}|^2 P_s + |h_{rd}|^2 P_r) \quad (10)$$

Optimal SCR

For our optimal SCR, we select powers $P_0$, $P_s$ and $P_r$, as a function of $|h_{sr}|^2$, $|h_{rd}|^2$, $|h_{sd}|^2$, and an objective overall transmission data rate R, from the following optimization:

$$\min_{P_0, P_s, P_r} \frac{\beta L P_0}{C(|h_{sr}|^2 P_0)} + \frac{L(P_s + P_r)}{C(|h_{sd}|^2 P_s + |h_{rd}|^2 P_r)} \quad (11)$$

subject to $P_0$, $P_s$, $P_r > 0$ and $$\beta = 1 - \frac{\log\left(1 + \frac{|h_{sd}|^2 P_s}{\sigma^2}\right)}{\log\left(1 + \frac{|h_{sd}|^2 P_s + |h_{rd}|^2 P_r}{\sigma^2}\right)} \quad (12)$$

$$R = \frac{C(|h_{sr}|^2 P_0)}{\beta} + C(|h_{sd}|^2 P_s + |h_{rd}|^2 P_r). \quad (13)$$

This optimization can be performed using conventional optimization techniques. After the optimal power allocations are determined, the transmission data rates can be computed using the capacity formulations above. The optimal transmission data rates in phase 2, corresponding to point A in FIG. 2, can be rewritten as $$R_{sd-mpr} = \frac{W}{2} \log\left(1 + \frac{|h_{sd}|^2 P_s}{\sigma^2}\right), \quad (14)$$

$$R_{rd-mpr} = \frac{W}{2} \log\left(1 + \frac{|h_{rd}|^2 P_r}{|h_{sd}|^2 P_s + \sigma^2}\right). \quad (15)$$

Slepian-Wolf Coding

We model the second phase of the SCR protocol using a multiple access channel. In the first phase, the source transmits the first fragment to the relay. The data that the source and relay transmit in the second phase can be correlated. This falls into the class of Slepian-Wolf problems in information theory. Distributed source coding (DSC), according to Slepian-Wolf, refers to the encoding of outputs of two or more physically separated sources. Specifically, the capacity region of the second phase of the SCR is $$0 \leq R_{sd-sw} \leq I(X_s; Y|X_r) \quad (16)$$

$$R_{sd-sw} + R_{rd-sw} \leq I(X_s; X_r; Y), \quad (17)$$

where $R_{uv-sw}$ denotes the transmission data rate between respective nodes u and v using Slepian-Wolf (uv-sw) coding, I(.,.) is the mutual information, $X_u$ is the transmitted signal from node u, and $Y=X_s+X_r+N$ is the received signal at the destination, where N is noise.

We select $X_r$ as zero-mean Gaussian distributed with variance $|h_{rd}|^2 P_r$, and $X_s=W_s+\upsilon X_r$ where $W_s$ is zero-mean Gaussian distributed with variance $|h_{sd}|^2 Ps - \upsilon^2 |h_{rd}|^2 Pr$, and $\upsilon$ is a control parameter that specifies the amount of this information the source also sends to the destination directly out of the $\beta L$ bits of information that the source has transmitted to the relay.

By expanding the mutual information in Equations (16-17), we obtain the following data rates:

$$R_{sd-sw} \leq C(|h_{sd}|^2 P_s - v^2 |h_{rd}|^2 P_r), \text{ and}$$

$$R_{sd-sw} + R_{rd-sw} \leq C(|h_{sd}|^2 P_s + (1+2v)|h_{rd}|^2 P_r),$$

$$\text{for } 0 \leq v \leq \sqrt{\frac{P_s |h_{sd}|^2}{P_r |h_{rd}|^2}}.$$

The capacity region of the Slepian-Wolf channel is shown in FIG. 2. Compared to multiple access channel, the Slepian-Wolf channel increases the achievable region, by region III in FIG. 2. Because the relay does not have any information on the content of the source in the second phase, the relay cannot help improve the transmission of the source. Hence, the maximum transmission data rate of the source remains the same as that for the multiple access channel.

However, by optimally selecting the parameter $\upsilon$, the source can allocate a different amount of power to assist the data that are transmitted by the relay. As a result, the relay can transmit at higher data rate even when the relay uses the same transmission power as used in the multiple access channel.

In terms of power profiles and power splitting ratio, the SCR protocol with Slepian-Wolf coding introduces the additional variable, $\upsilon$, into the optimization problem. Nonetheless, for a given $\upsilon$, all the derivations for the optimal SCR above hold.

For optimal SCR with Slepian Wolf coding, select $P_0$, $P_s$, $P_r$ and $\upsilon$ as a function of $|h_{sr}|^2$, $|h_{rd}|^2$, $|h_{sd}|^2$ and an objective overall transmission data rate R, from the following optimization:

$$\min_{P_0, P_s, P_r, v} \frac{\beta L P_0}{C(|h_{sr}|^2 P_0)} + \frac{L(P_s + P_r)}{C(|h_{sd}|^2 P_s + (1+v^2)|h_{rd}|^2 P_r)} \quad (18)$$

subjected to $P_0$, $P_s$, $P_r > 0$ and $$0 \leq v \leq \sqrt{\frac{|h_{sd}|^2 P_s}{|h_{rd}|^2 P_r}} \quad (19)$$

$$\beta = 1 - \frac{C(|h_{sd}|^2 P_s - v^2 |h_{rd}|^2 P_r)}{C(|h_{sd}|^2 P_s + (1+v^2)|h_{rd}|^2 P_r)} \quad (20)$$

$$R = \frac{C(|h_{sr}|^2 P_0)}{\beta} + C(|h_{sd}|^2 P_s + (1+v^2)|h_{rd}|^2 P_r). \quad (21)$$

The corresponding optimal data rates are:

$$R_{sr} = C(|h_{sr}|^2 P_o) \quad (22)$$

$$R_{sd-sw} = C(|h_{sd}|^2 P_s - v^2 |h_{rd}|^2 P_r) \quad (23)$$

$$R_{rd-sw} = \frac{W}{2} \log\left(1 + \frac{(1+2v^2)|h_{rd}|^2 P_r}{|h_{sd}|^2 P_s - v^2 |h_{rd}|^2 P_r + \sigma^2}\right). \quad (24)$$

Results For Optimal SCR

Figure 3:
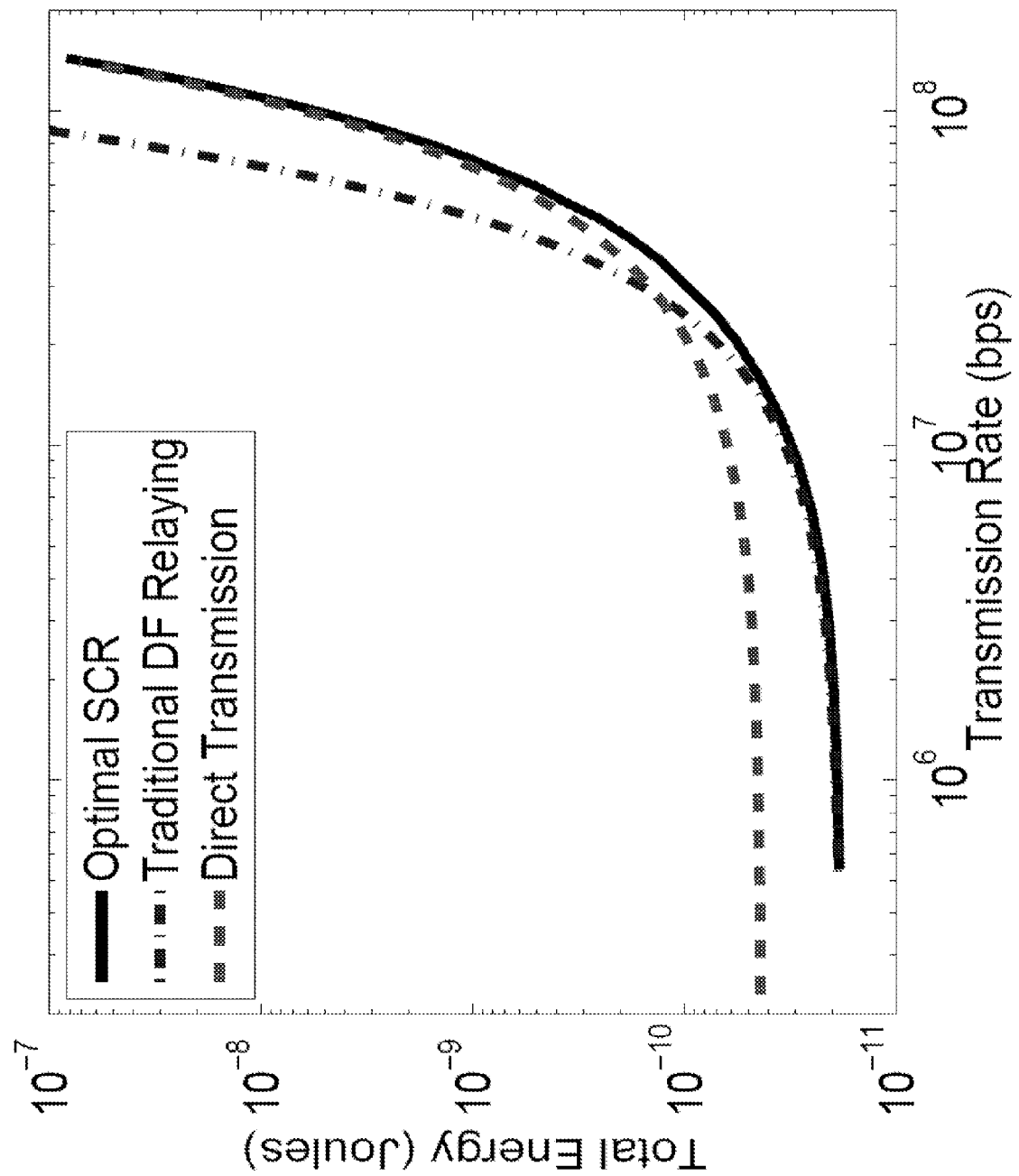
FIG. 3 are graphs comparing total energy consumption for conventional relaying and relaying according to embodiments of the invention as a function of bit rate.

FIG. 3 shows that the optimal SCR protocol achieves better performance compared to both direct transmission (DT) and decode-and-forward (DF) relaying, independent of the transmission data rate. FIG. 3 shows the transmission data rate in bits-per-second (bps) as a function of total energy in Joules.

FIG. 4 shows the corresponding optimal power allocations a function of the transmission data rate of our SCR. The circles (○), crosses (×), and triangles (▲) denote the transmit powers at the source during phase 1, phase 2, the relay, respectively. At a high transmission data rate, the optimal transmit power of the source at the two phases are about equal.

At a low transmission data rate, optimal SCR achieves overall energy saving by reducing the transmission power of the source during the second phase. However, in reality, the receiver sensitivity constraint requires the transmit power to be above a certain threshold. Also, a small $P_s$ in the second phase implies that the split ratio β is close to one. In this case, it becomes impractical to apply channel coding to the $(1-\beta)L$ bits efficiently. Hence, we use conventional DF relaying for low data rate applications.

Figure 5:
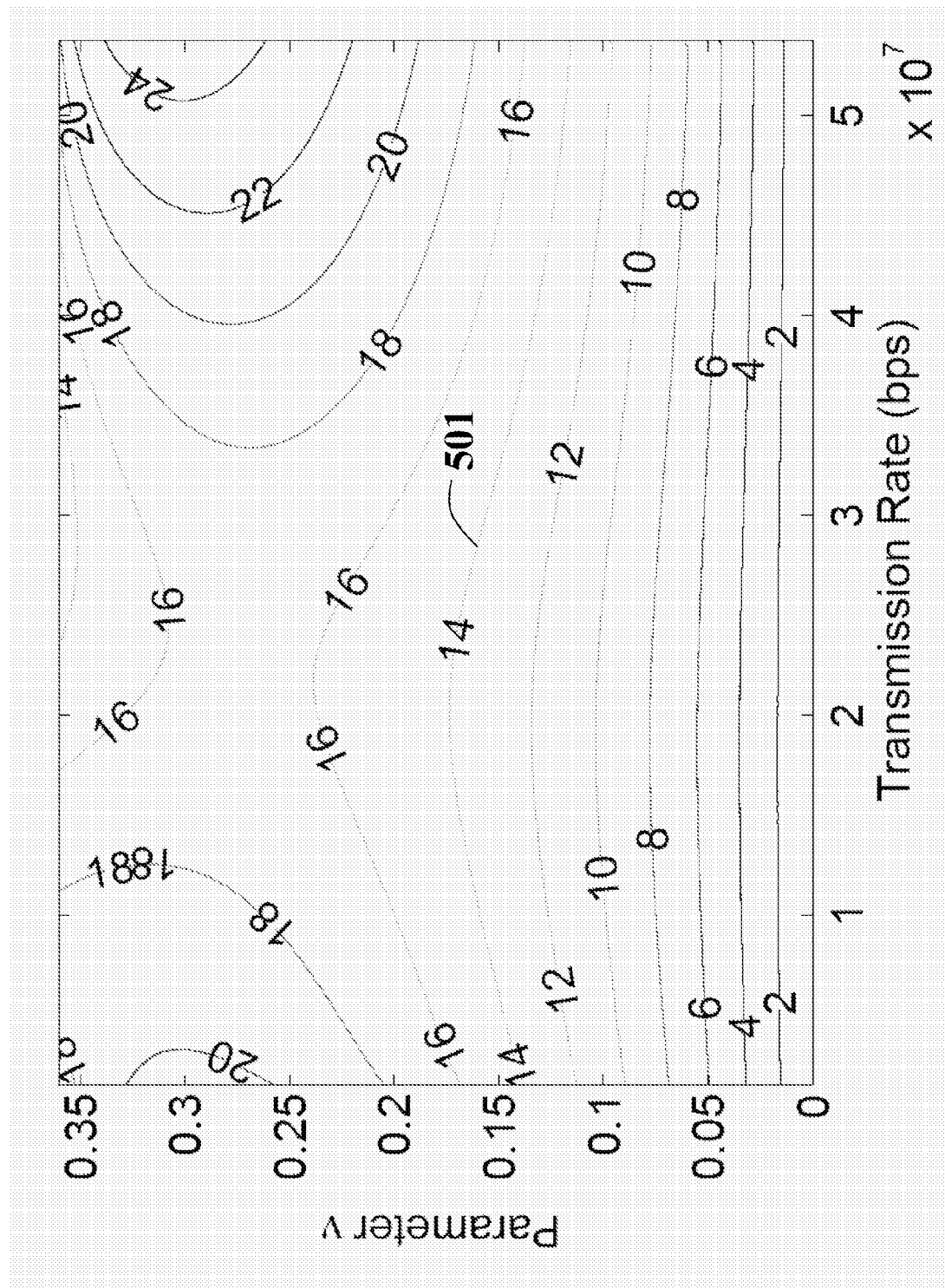
FIG. 5 are graphs of transmission rate as a function of a parameter $\upsilon$ according to embodiments of the invention and contours denoting equal energy saving percentages.

FIG. 5 shows the transmission data rate in bps as a function of the parameter $\upsilon$. The contours 501 in FIG. 5 denote the equal energy saving percentages. FIG. 5 shows how the parameter $\upsilon$ affects the overall energy consumption of the SCR protocol. For the specific case considered, SCR with Slepian-Wolf can reduce the total energy consumption by as much as over 16%, for the parameter $\upsilon$ at about 0.25. That is, about 25% of fragment $\beta L$ 111 sent to the relay in the first phase is retransmitted directly to the destination by the source in the second phase, along with the second fragment $(1-\beta)L$ 112.

EFFECT OF THE INVENTION

Provided is a method for optimizing power consumption in a relay network that uses split-and-combine Relaying (SCR) for a given transmission data rate constraint. The method provides the fundamental optimization framework to obtain power and rate allocation and the corresponding packet splitting ratio for optimal SCR. The method also provides an extension for Slepian-Wolf coding to further reduce energy consumption. Typically, the amount of energy consumed can be reduced by 16% compared to the conventional SCR.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for transmitting a packet in a relay network including a source node, a relay node and a destination node, comprising:

partitioning, in a source node of a relay network, a packet into a first fragment and a second fragment, wherein the packet has L bits and the first fragment has $\beta L$ and the second fragment has $(1-\beta)L$ bits, where $\beta$ is a splitting ratio;

transmitting the first fragment from the source node to a relay node of the relay network at a first data rate during a first phase;

transmitting the second fragment from the source node to a destination node in the relay network at a second data rate during a second phase;

combining the first fragments and the second fragment in the destination node;

retransmitting the first fragment from the relay node to the destination node at a third data rate during the second phase; and optimizing the first, second and third data rates so that a total energy consumption in the network is minimized, wherein $P_0$ is a power used by the source node during the first phase, $p_s$ is the power used by the source during the second phase, and $p_r$ is the power used by the relay node during the second phase and wherein a power gain between the source node s and the relay node r is $|h_{sr}|^2$, and the power gain between the relay node s and the destination node d is $|h_{rd}|^2$, and the combining is according to $h_{sd}$ and $h_{rd}$, and wherein the energy consumption is minimized according to $$\frac{\beta L P_r}{R_{rd-mpr}} + \frac{(1-\beta)L P_s}{R_{sd-mpr}},$$

where $R_{rd-mpr}$ is the third data rate and $R_{sd-mpr}$ is the second data rate.

2. The method of claim 1, further comprising:
retransmitting a fraction of the first fragment from the source node to the destination node at the second data rate during the second phase.

3. The method of claim 2, wherein the retransmitting of the fraction of the first fragment uses Slepian-Wolf coding.

4. The method of claim 1, wherein $P_0$ is a power used by the source node during the first phase, $p_s$ is the power used by the source during the second phase, and $p_r$ is the power used by the relay node during the second phase.

5. The method of claim 1, wherein the second data rate $R_{sd}$ from the source to the destination satisfies $R_{sd} \leq C(|h_{sd}|^2 P_s)$, where $$C(x) = \frac{W}{2}\log\left(1 + \frac{x}{\sigma^2}\right), \quad (1)$$

where C is a channel capacity, W is an available bandwidth in the network, $\sigma^2$ is a receiver noise power of a transmitted signal x, and log denotes the logarithm in base 2.

6. The method claim 5, in which the transmitting of the second fragment and the retransmitting of the first fragment use multiple-packet reception (mpr), and packets are received successfully if and only if the second data rate $R_{sd-mpr}$ and the third data rate $R_{rd-mpr}$, satisfy an information theoretic bounds for a multiple access channel according to $$R_{sd-mpr} \leq C(|h_{sd}|^2 P_s)$$

$$R_{rd-mpr} \leq C(|h_{rd}|^2 P_r)$$

$$R_{sd-mpr} + R_{rd-mpr} \leq C(|h_{sd}|^2 P_s + |h_{rd}|^2 P_r).$$

7. The method of claim 5, wherein bounds on the split ratio $\beta$ are $$1 - \frac{C(|h_{sd}|^2 P_s)}{C(|h_{sd}|^2 P_s + |h_{rd}|^2 P_r)} \leq \beta \leq \frac{C(|h_{rd}|^2 P_r)}{C(|h_{sd}|^2 P_s + |h_{rd}|^2 P_r)}, \text{ and}$$

optimal data rates in the second phase at the source and relay are respectively $$R_{sd-mpr} = (1-\beta)C(|h_{sd}|^2 P_s + |h_{rd}|^2 P_r)$$

$$R_{rd-mpr} = \beta C(|h_{sd}|^2 P_s + |h_{rd}|^2 P_r).$$

8. The method of claim 7, further comprising:
selecting the powers $P_0$, $P_s$ and $P_r$, as a function of $|h_{sr}|^2$, $|h_{rd}|^2$, $|h_{sd}|^2$, and an objective overall transmission data rate R optimizes:

$$\min_{P_0, P_s, P_r} \frac{\beta L P_0}{C(|h_{sr}|^2 P_0)} + \frac{L(P_s + P_r)}{C(|h_{sd}|^2 P_s + |h_{rd}|^2 P_r)}$$

subject to $P_0$, $P_s$, $P_r > 0$ and $$\beta = 1 - \frac{\log\left(1 + \frac{|h_{sd}|^2 P_s}{\sigma^2}\right)}{\log\left(1 + \frac{|h_{sd}|^2 P_s + |h_{rd}|^2 P_r}{\sigma^2}\right)}, \text{ and}$$

$$R = \frac{C(|h_{sr}|^2 P_0)}{\beta} + C(|h_{sd}|^2 P_s + |h_{rd}|^2 P_r).$$

9. The method of claim 1, wherein a transmission delay and a retransmission delay during the second phase are equal.

10. The method of claim 1, wherein the first and second segments are respectively transmitted and retransmitted concurrently during the second phase.

11. The method of claim 1, wherein the second and third data rates are different.

12. The method of claim 1, wherein all nodes have a single antenna, one transceiver radio frequency chain.

13. The method of claim 1, wherein the nodes use the same frequency band.

* * * * *